United States Patent
Averbuch et al.

[19]

[11] Patent Number: 6,160,805

[45] Date of Patent: Dec. 12, 2000

[54] METHOD FOR SYNCHRONIZING A SESSION TIMER

[75] Inventors: Rod Averbuch, Buffalo Grove; Karen A. Brailean, Park Ridge; Jeffrey J. Blanchette, Palatine, all of Ill.

[73] Assignee: Motorola, Inc., Schaumburg, Ill.

[21] Appl. No.: 08/722,382

[22] Filed: Sep. 30, 1996

[51] Int. Cl.[7] .............................. H04J 3/06; H04B 7/00
[52] U.S. Cl. ................................. 370/350; 455/517
[58] Field of Search ................................ 370/350, 322, 370/324, 337, 336, 335, 342, 428, 455, 445; 375/355, 356, 365; 455/502, 503, 67.1, 67.3, 507, 512, 524, 519, 560, 403, 452, 464; 320/337, 349

[56] References Cited

U.S. PATENT DOCUMENTS

| | | | |
|---|---|---|---|
| 5,193,111 | 3/1993 | Matty et al. | 379/106 |
| 5,384,827 | 1/1995 | Oriskasa | 455/464 |
| 5,485,632 | 1/1996 | Ng et al. | 455/67.1 |
| 5,502,721 | 3/1996 | Pohjakallio | 370/337 |
| 5,502,725 | 3/1996 | Pohjakallio | 370/337 |
| 5,517,505 | 5/1996 | Buchholz et al. | 370/350 |
| 5,633,872 | 5/1997 | Dinskins | 370/324 |
| 5,729,540 | 3/1998 | Wegrzyn | 370/336 |
| 5,748,620 | 5/1998 | Capurka | 370/328 |
| 5,802,465 | 9/1998 | Hamalainen et al. | 455/560 |
| 5,835,860 | 11/1998 | Diachina | 455/519 |

*Primary Examiner*—Chi H. Pham
*Assistant Examiner*—Steven Nguyen
*Attorney, Agent, or Firm*—Christopher P. Moreno; Jeffrey K. Jacobs

[57] ABSTRACT

In a wireless communication system, session timers are separately maintained by a communication device (101) and a system controller (104). When a portion of outbound data is sent to a base station (102) for transmission to the communication device, the base station creates at least one transmission time stamp which is then sent to the system controller (203). If a session has not been previously established, the system controller uses the at least one transmission time stamp to establish a session and initiate a session timer (204). If a session has been previously established, the system controller uses the at least one transmission time stamp to determine whether to continue the current session timer (709). This applies to inbound data as well. Furthermore, session timers can also be synchronized to paging acknowledgments (305), channel information messages (503) or channel access messages (602). In this manner, session timers are more accurately synchronized.

42 Claims, 8 Drawing Sheets

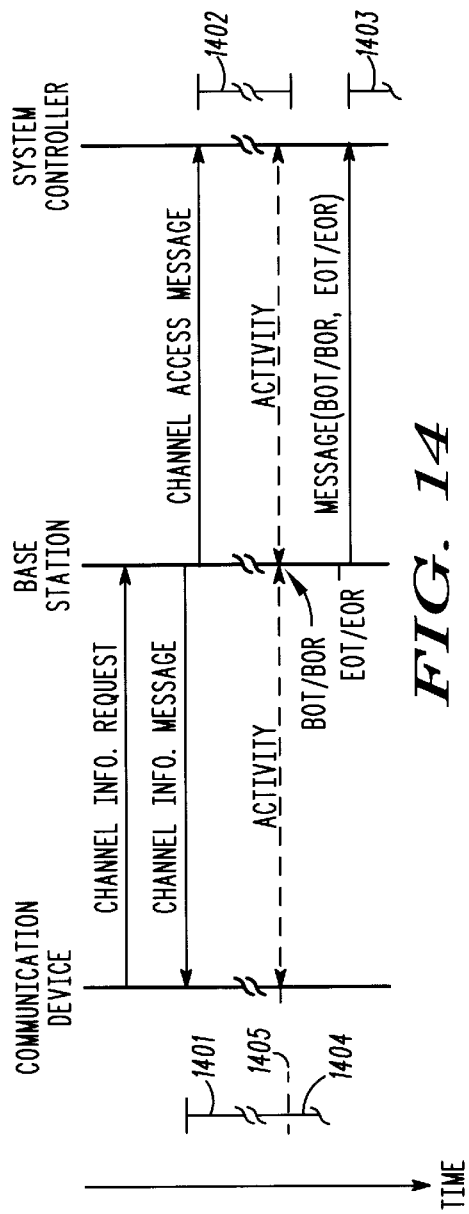
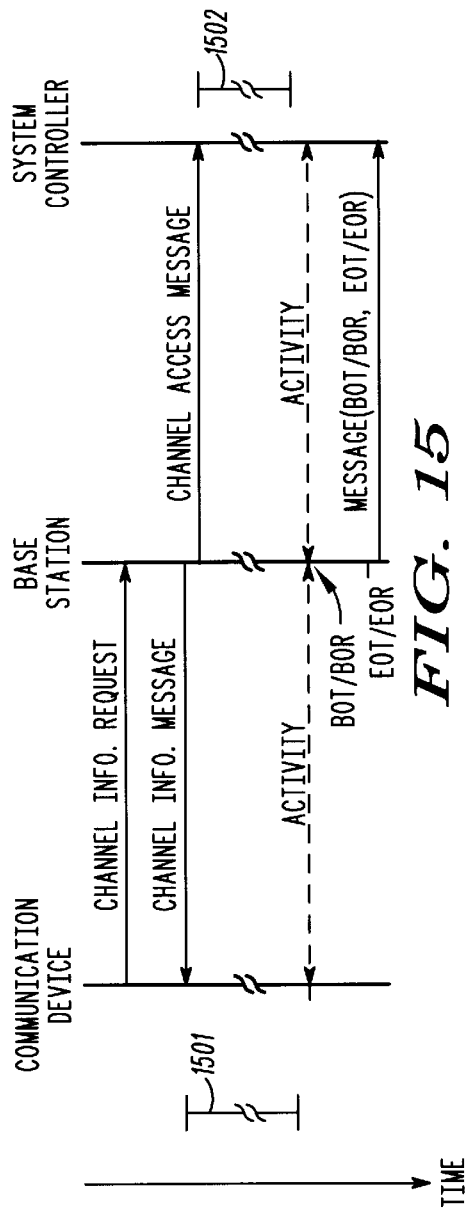

METHOD FOR SYNCHRONIZING A SESSION TIMER

FIELD OF THE INVENTION

The present invention relates generally to wireless communication systems and, in particular, to a method for synchronizing a session timer therein.

BACKGROUND OF THE INVENTION

Methods for establishing and maintaining communications within wireless communication systems are well known in the art. In U.S. patent application Ser. No. 08/640,291 entitled "Method For Providing Communications To A Communication Device In A Radio Communication System" by Capurka, filed Apr. 30, 1996 and assigned to the same assignee as the present invention, a technique is described wherein a communication device (e.g., a portable or mobile radio), while roaming within a wireless communication system, registers with individual base sites and location areas (each location area encompassing the coverage areas of one or more base sites).

When a communication (e.g., a packet data communication) destined for the communication device is received by a system controller, the system controller determines whether the communication was received within a predetermined period of time after a previous communication involving the communication device. When the communication is received within this predetermined period of time, the system controller transmits at least a portion of the communication to the communication device via the base site.

However, when the communication is received subsequent to the predetermined period of time, the system controller transmits a page to the communication device via the base sites serving the location area to inform the communication device of the awaiting communication. Upon receiving an acknowledgment of the page, the system controller transmits the communication, or a portion thereof, to the communication device via the base site that received the acknowledgment. In this manner, Capurka substantially reduces the amount of control channel activity (i.e., paging) normally associated with delivering a communication by presuming that the communication device has not moved out of the coverage area of the base site for a predetermined amount of time after the communication device's involvement in a previous communication.

In effect, Capurka describes the concept of a session wherein communications with a given communication device are carried out in one manner while a session is in progress, and are carried out in another manner when a session is not in progress. The maintenance of each session is predicated on the occurrence of events within the predetermined period of time. Both the system controller and the communication device keep track of the predetermined period of time, thereby independently determining whether a session is still in progress. However, due to variable delays within the infrastructure of the communication system, it is possible that the system controller and communication device may lose synchronization in measuring the predetermined period of time. As a result of this, communications with the communication device may be delayed or even lost. For example, if the controller times out of a session prematurely and receives an outbound communication destined for a communication device, the outbound communication will not be sent to the mobile directly. Because the controller believes that the communication device is not in session, the device will be paged to announce the pending communication, leading to inefficient use of communication resources. Also, because the communication device is still within a session, it will be monitoring a traffic channel, rather than a control channel, and will quite likely miss the page and the subsequent outbound communication altogether.

Therefore, a need exists for a method of maintaining session synchronization between a communication device and a system controller.

BRIEF DESCRIPTION OF THE DRAWINGS

FIGS. 14–15 illustrate exemplary operations of an embodiment of the present invention based on a channel information request and a channel access message.

DESCRIPTION OF A PREFERRED EMBODIMENT

Figure 1:
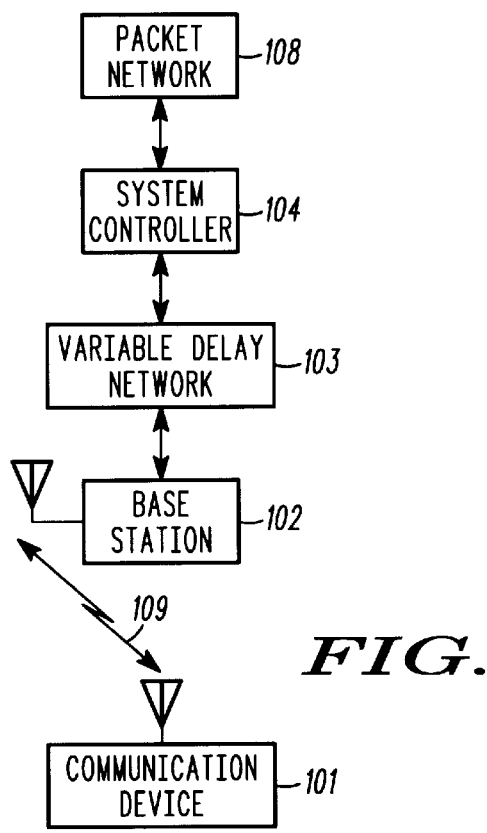
FIG. 1 is a block diagram of a wireless communication system that may beneficially employ the present invention.

Generally, the present invention provides a method for synchronizing a session timer. In a wireless communication system that includes communication devices in wireless communication with a system infrastructure, session timers separately maintained by a communication device and the system infrastructure are synchronized to the time at which outbound portions of data (data sent to a communication device) are actually transmitted by a base station. Likewise, the session timers can be synchronized to the time at which inbound portions of data (data sent by a communication device) are actually received by a base station. The session timers can also be synchronized to a paging acknowledgment received by the system infrastructure. Further still, synchronization can be based on channel information requests sent by a communication device and on channel access messages received by a system controller.

In particular, when a portion of outbound data is sent from the infrastructure to a base station for transmission to a communication device, the base station notes when the outbound portion of data was actually transmitted and thereby creates at least one transmission time stamp. The at least one transmission time stamp is sent to a system controller. If a session has not been previously established, the system controller uses the at least one transmission time stamp to establish a session and initiate a session timer. If a session has been previously established, the system controller uses the at least one transmission time stamp to determine whether to continue the current session timer. These same procedures can be based on an inbound portion of data sent by a communication device and received by a base station, i.e., at least one reception time stamp is similarly used to either initiate or possibly continue a session timer.

In another embodiment, assuming a session has not been previously established, a paging message is sent from the infrastructure to the communication device via a base station. When a paging acknowledgment, responsive to the paging message, is received by the infrastructure, the session and session timer are initiated. Once the session has been established in this manner, it can be continued as described above.

In yet another embodiment, assuming a session has not been previously established, a communication device transmits a channel information request. Upon receiving a channel information message, responsive to the channel information request, the communication device initiates the session and session timer. Additionally, a channel access message, also responsive to the channel information request, is sent to the system controller. The session and session timer are then initiated in the system controller based upon the channel access message.

Regardless of the particular embodiment used, the present invention allows session timers to be more accurately maintained within a system's infrastructure, and therefore more accurately synchronized to session timers maintained by communication devices.

The present invention can be more fully described with reference to FIGS. 1–15. FIG. 1 is a block diagram of a wireless communication system 100 that may beneficially employ the present invention. The wireless system 100 includes a plurality of communication devices 101 (only one shown), a plurality of base stations 102 (only one shown), a variable delay network 103, and a system controller 104. In the preferred embodiment, the wireless communication system 100 comprises a trunked radio frequency (RF) communication system, such as the "IDEN" platform that is commercially available from Motorola, Inc. The communication devices 101, base stations 102, and system controller 104 each include separate processing devices (such as microprocessors, digital signal processors, etc.) and digital memories (such as random-access memory, read-only memory, disk drives, etc.) which can be used to store and execute software algorithms, including any software algorithms used to implement the present invention.

The system controller 104 generally coordinates communications to and from the communication devices 101.

In the preferred embodiment, the system controller 104 is an "IDEN" Motorola Data Gateway (MDG), manufactured by Motorola, Inc., which includes the controller and a packet data router. The system controller 104 communicates with the base stations 102 via a variable delay network 103. The variable delay in the variable delay network 103 is a result of dynamic changes in packet channel throughput (via the wireless communication resource 109) based on voice resource allocation, wherein voice has a high priority. Additionally, packet queuing, network loading, and retransmissions due to errors cause delays in outbound traffic. Generally, in any network that supports more than one service with differing levels of allocation priority, the higher priority services will impose variable delays on the other services.

In accordance with directions received from the system controller 104, the base stations 102 (which preferably support one or more trunking protocols such as frequency division multiple access (FDMA), time division multiple access (TDMA) or code division multiple access (CDMA)) communicate with the communication devices 101 via wireless communication resources 109. The wireless communication resources 109 comprise one or more RF channels capable of supporting the above-mentioned protocols. In the preferred embodiment, the base stations 102 comprise "IDEN" Enhanced Base Transceiver Sites. The communication devices 101 preferably comprise any wireless devices, such as wireless data terminals, radios, or radiotelephones that are capable of transceiving data packets, as known in the art.

The system controller 104 also communicates with a packet network 108. Suitable packet networks, for example, include those adhering to the Internet Protocol (IP), Novell's IPX protocol or Apple Talk. In the preferred embodiment, the packet network 108 comprises an IP network. Although the packet network 108 is shown connected directly to the system controller 104, the connection is a logical one in the preferred embodiment, with intermediate protocol layers used to establish the connection directly to the packet data router portion of the system controller 104.

When packet data traffic arises involving a given communication device 101 and the wireless infrastructure 102–104, session timers are maintained by the system controller 104 and the communication device 101. In the preferred embodiment, the MDG maintains information regarding sessions and session timers. As noted above, however, when data is conveyed through the variable delay network 103, in either the inbound or outbound direction, the possibility exists that significant delays (anywhere from several milliseconds to several minutes in length) will be incurred. Such delays disrupt synchronization of session timers between communication devices and the system infrastructure. The present invention serves to ensure synchronization between session timers implemented by communication devices and those implemented within the wireless system infrastructure.

Figure 2:
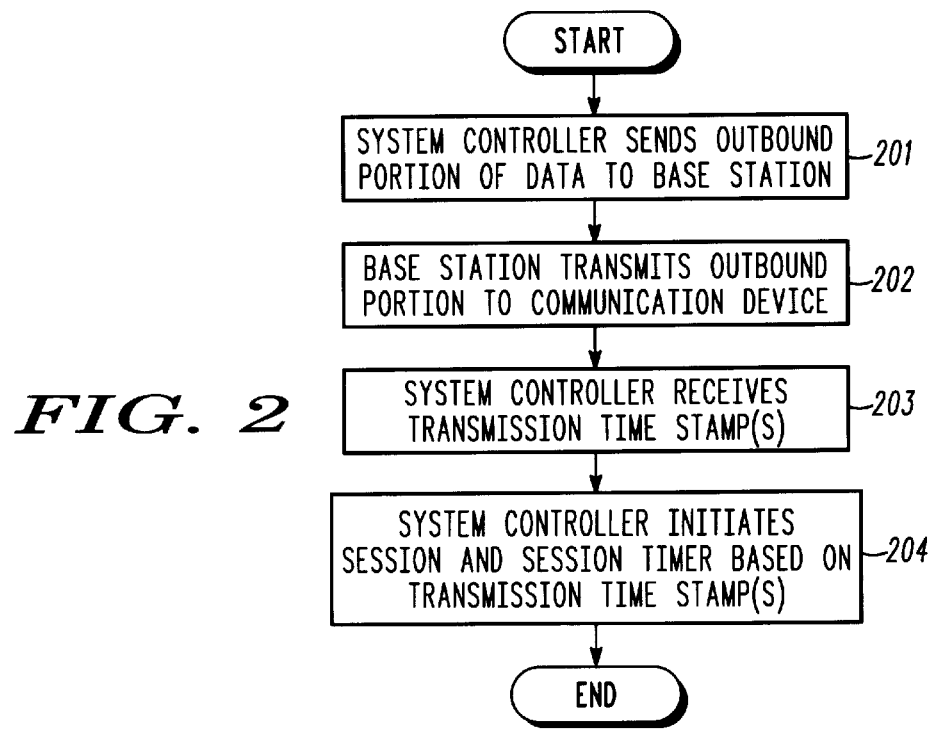
FIG. 2 is a flow chart illustrating steps for initiating the synchronization of a session timer in response to an outbound portion of data.

FIG. 2 is a flow chart illustrating steps for initiating the synchronization of a session timer in response to an outbound portion of data. Thus, it is assumed throughout the explanation of FIG. 2 that no session or session timer has been established previously. At step 201, the system controller 104 (or in the preferred embodiment, the router) sends an outbound portion of data to a base station 102. Because the delays incurred in the network 103 are variable, it is possible that the outbound portion of data will be significantly delayed before arriving at the communication device 101. In the preferred embodiment, the outbound portion of data (and any subsequent outbound portions of data) comprises at least one outbound data packet (as known in the art) and, in this instance, is the initial portion of data to be sent to a given communication device 101. The outbound portion of data may have arrived at the system controller 104 via the packet network 108, as would be the case of a communication originated outside the wireless system 100. (E.g., a subscriber to the public switched telephone network (PSTN), a subscriber to an IP network, or a subscriber to an asynchronous transfer mode (ATM) network, all connected to the wireless system 100 via the packet network 108.) Alternatively, the outbound portion of data may have arrived at the system controller 104 via a communication originated within the wireless system 100, e.g., sourced by another communication device.

At step 202, the base station 102 transmits the outbound portion of data to the targeted communication device 101. When the communication device 101 receives the transmitted outbound portion of data, it will initiate a session and session timer.

Prior to, during, or after the actual transmission of the outbound portion of data, the base station 102 determines at least one transmission time stamp corresponding to the outbound portion of data. That is, the base station 102 can determine the actual points in time at which transmission of the outbound portion of data begins and/or ends. Such points in time, and any others in between, can be measured and noted by the base station 102 and used to produce the at least one transmission time stamp. In one embodiment, the at least one transmission time stamp comprises a beginning of transmission (BOT) time stamp (indicating when transmission actually began) and an end of transmission (EOT) time stamp (indicating when transmission actually ended). As those of ordinary skill in the art will recognize, it is possible for the base station 102 to perform this determination before or after the actual transmission takes place, depending upon the particular implementation of the base station 102. Regardless of when it is determined, the at least one transmission time stamp is sent to the system controller 104. If determined prior to transmission, the at least one time transmission time stamp can be sent to the system controller 104 even before actual transmission begins. When more than one time stamp is used (e.g., BOT and EOT time stamps), the respective time stamps can be sent to the system controller either concurrently or at different times.

At step 203, the system controller 104 receives the at least one transmission time stamp and, at step 204, initiates a session. It is understood that the session can be initiated, in the sense that the system controller 104 is aware of an ongoing communication with the communication device 101, at that point in time corresponding to step 201 or at any point in time thereafter. Equally important, the system controller 104 also initiates, at step 204, a session timer based on the at least one transmission time stamp. When BOT and EOT time stamps are used, the session timer is initialized such that a predetermined period of time is measured starting at the point in time indicated by the EOT time stamp. This is illustrated in both FIGS. 6 and 7.

In FIGS. 8–15, the progression of time is represented proceeding from top to bottom of each figure. Thus, in FIGS. 8 and 9, an outbound portion of data is shown being sent to the base station 102 and, thereafter, a BOT and EOT are determined by the base station 102. In the examples shown, the BOT and EOT time stamps are conveyed to the system controller 104 after the BOT and EOT have been determined, although other implementations are possible, as described above. Regardless, after receiving the EOT, the system controller 104 initiates a session timer 801, 901 starting at a point in time indicated by the EOT. Because, in this example, the EOT time stamp is conveyed after the actual EOT has occurred, the session timer is adjusted to start at a point in time prior to reception of the EOT time stamp, thereby more accurately reflecting the actual progression of the session. In the preferred embodiment, the predetermined period of time measured by the session timer 801, 901 is in the range of 5 to 50 seconds, although other predetermined periods of time are possible.

Figure 3:
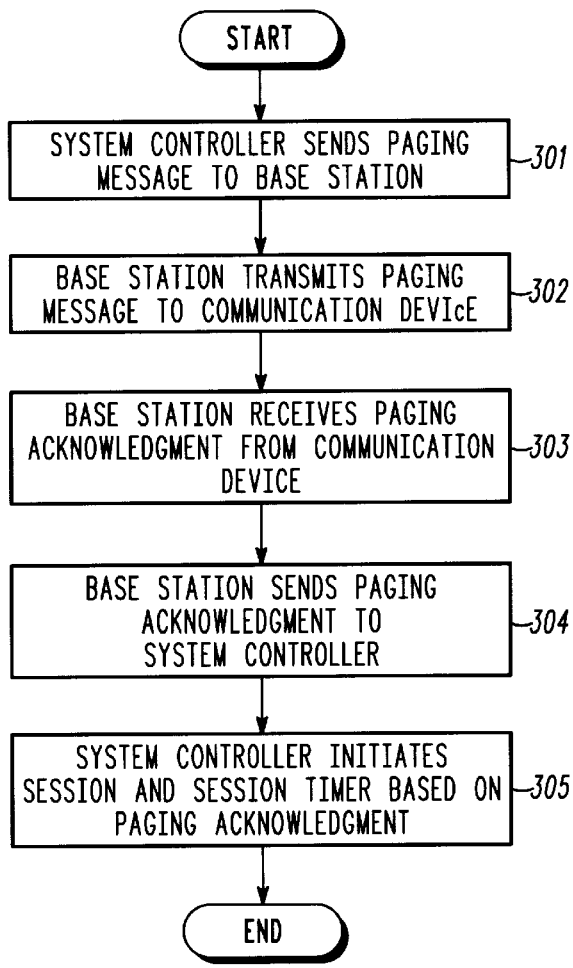
FIG. 3 is a flow chart illustrating steps for initiating the synchronization of a session timer in response to a paging acknowledgment.

Specific forms of outbound activity, in addition to outbound data, can be used for synchronization, as illustrated in FIG. 3. FIG. 3 is a flow chart illustrating steps for initiating the synchronization of a session timer in response to a paging acknowledgment. It is assumed throughout the discussion of FIG. 3 that no previous session or session timer has been established. At step 301, the system controller 104 sends a paging message, destined for a particular communication device 101, to a base station 102. In turn, the base station 102 transmits the paging message to the communication device 101 at step 302. As known in the art, paging messages serve to notify particular communication devices that a communication (i.e., a message) involving the communication device is currently pending.

The present invention contemplates at least two methods whereby the paging message is sent to the communication device 101. In the first method, the paging message is sent via a control channel only. The use of control channels for the conveyance of control messages is well known in the art. Thus, if the wireless communication system 100 operates according to FDMA principles, the paging message can be sent via a control channel implemented by a unique radio frequency (RF) carrier. However, if the wireless communication system 100 operates according to TDMA principles, the paging message can be sent via a control channel implemented as one or more predetermined time slots on a single RF carrier.

In the second method, the paging message is sent via a control channel, as described above, and via a data channel. The use of data channels in conjunction with control channels is well known in the art. The second method more reliably ensures that a given communication device will receive the paging message. That is, if the communication device is currently monitoring a data channel (i.e., a separate RF frequency in FDMA systems or predetermined time slots in a TDMA system), it will receive the paging message via the data channel. Conversely, if the communication device is not monitoring a data channel and is instead monitoring the control channel, it will receive the paging message via the control channel.

Regardless of the method used to convey the paging message, once the communication device has received the paging message, it responds by transmitting a paging acknowledgment, as known in the art. Additionally, the communication device initiates a session and a session timer based on the time at which the paging acknowledgment was sent. If the paging message was received by the communication device via a control channel, the communication device transmits the paging acknowledgment via the control channel. Conversely, if the paging message was received via the data channel, the paging acknowledgment is transmitted via the data channel.

Regardless of whether the control or data channel is used to transmit the paging acknowledgment, the base station 102 receives the paging acknowledgment at step 303 and, at step 304, sends the paging acknowledgment to the system controller 104. Upon receiving the paging acknowledgment, the system controller 104 initiates a session at step 305. In practice, the session cannot be initiated before the paging acknowledgment has been received because it is possible that the communication device will not receive the paging message, and therefore will not respond with a paging acknowledgment. In addition to initializing the session, the system controller 104 also initiates a session timer based on the paging acknowledgment at step 305. This is illustrated in FIGS. 10 and 11.

Figure 10:
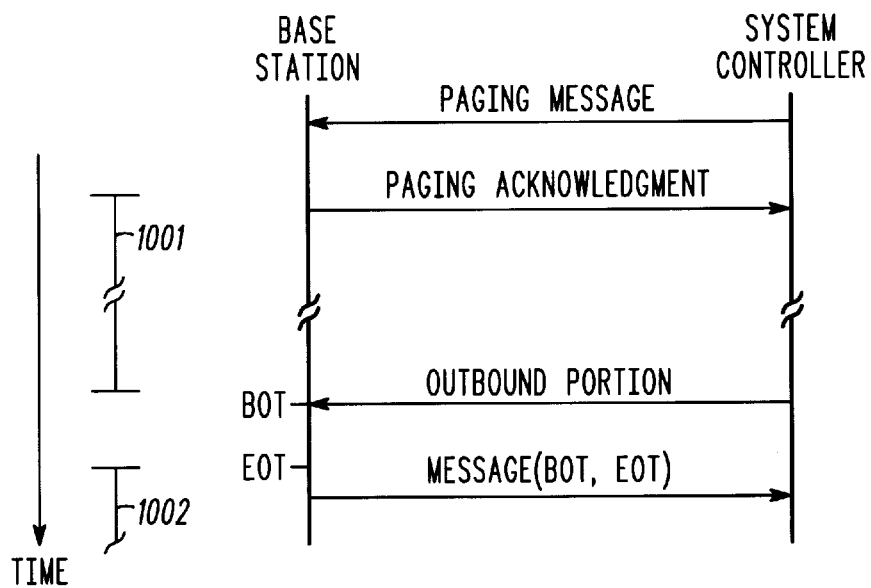
FIGS. 10–11 illustrate exemplary operations of an embodiment of the present invention based on a paging acknowledgment.
Figure 11:
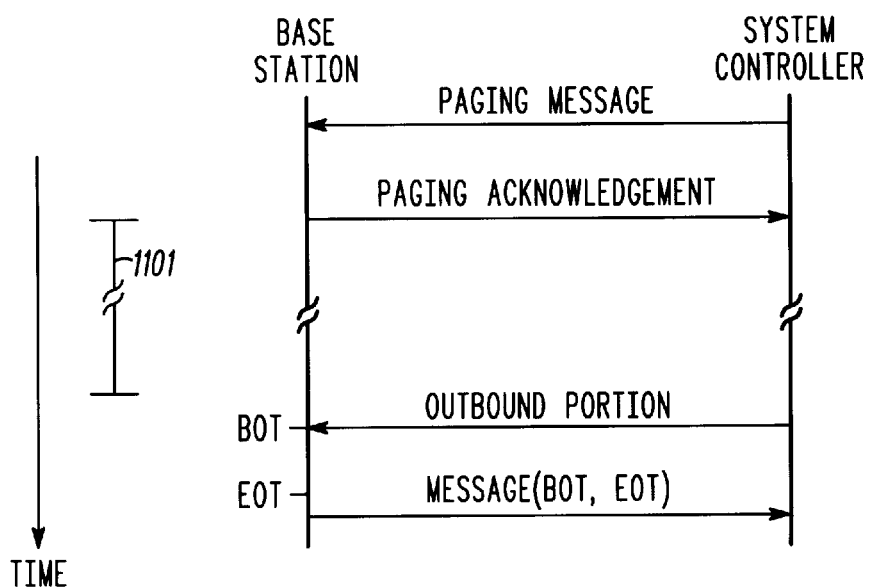

With the progression of time shown from top to bottom, FIGS. 10 and 11 show a paging message being sent to the base station 102 and, thereafter, a paging acknowledgment being sent back to the system controller 104. The system controller 104 initiates a session timer 1001, 1101 at a point in time corresponding to when the paging acknowledgment was actually received by the system controller 104. As before, the session timer 1001, 1101 measures a predetermined period of time corresponding to the intended length of the session. Assuming a small delay between the communication device transmitting the paging acknowledgment and the system controller receiving the paging acknowledgment (as is typically the case), the session timer maintained by the communication device and the session timer 1001, 1101 maintained by the system controller 104 will be closely synchronized.

Figure 4:
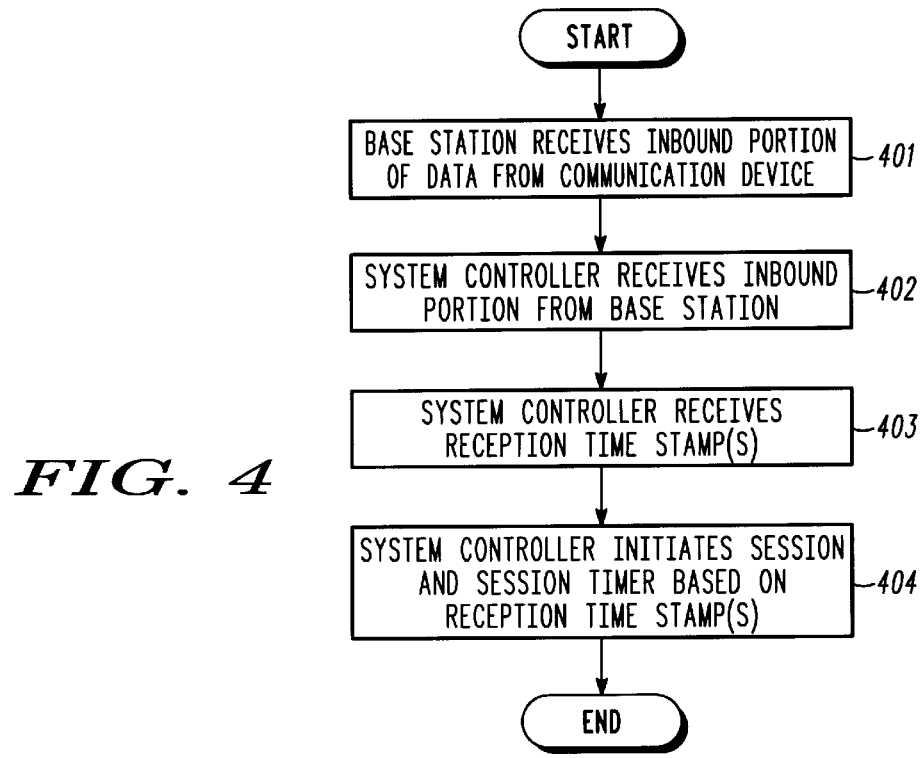
FIG. 4 is a flow chart illustrating steps for initiating the synchronization of a session timer in response to an inbound portion of data.

FIG. 4 is a flow chart illustrating steps for initiating the synchronization of a session timer in response to an inbound portion of data. Such a method is preferably used when inbound delays through the variable delay network 103 are significant to the point that operation of sessions and session timers could be disrupted. Similar to FIGS. 2 and 3, it is assumed throughout the explanation of FIG. 4 that no session or session timer has been established previously. At step 401, the base station 102 receives an inbound portion of data from a given communication device 101. The inbound portion of data may be destined for other wireless or wireline communication systems via the packet network 108, or may be directed, under the control of the system controller 104, towards another communication device within the same wireless system 100. In the preferred embodiment, the inbound portion of data (and any subsequent inbound portions of data) comprises at least one inbound data packet (as known in the art) and, in this instance, is the initial portion of data received from the communication device 101 Upon transmitting the inbound portion of data, the communication device 101 initiates a session and a session timer.

At step 402, the system controller 104 receives the inbound portion of data sent by the base station 102. During or after the actual reception of the inbound portion of data, the base station 102 determines at least one reception time stamp corresponding to the inbound portion of data. Analogous to the at least one transmission time stamp discussed above, the at least one reception time stamp corresponds to points in time during the reception of the inbound portion of data. In one embodiment, the at least one reception time stamp comprises a beginning of reception (BOR) time stamp (indicating when reception actually began) and an end of reception (EOR) time stamp (indicating when reception actually ended). The at least one reception time stamp is sent to the system controller 104. When more than one time stamp is used (e.g., BOR and EOR time stamps), the respective time stamps can be sent to the system controller either concurrently or at different times.

At step 403, the system controller 104 receives the at least one reception time stamp and, at step 404, initiates a session. Similar to the outbound data case, it is understood that the session can be initiated, in the sense that the system controller 104 is aware of an ongoing communication with the communication device 101, at that point in time corresponding to step 401 or at any point in time thereafter. Also at step 404, the system controller 104 initiates a session timer based on the at least one reception time stamp. When BOR and EOR time stamps are used, the session timer is initialized such that a predetermined period of time is measured starting at the point in time indicated by the EOR time stamp. This is illustrated in both FIGS. 12 and 13.

Figure 12:
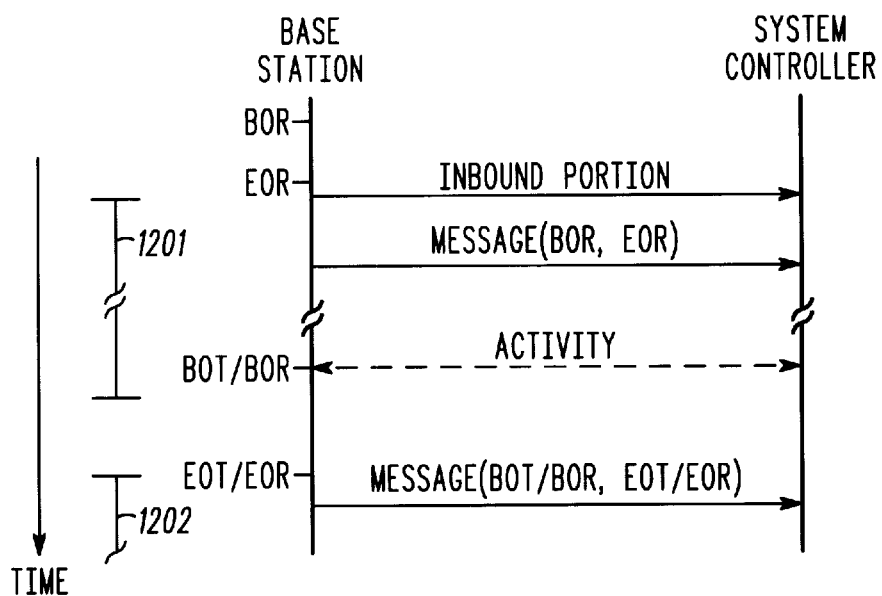
FIGS. 12–13 illustrate exemplary operations of an embodiment of the present invention based on an inbound portion of data.
Figure 13:
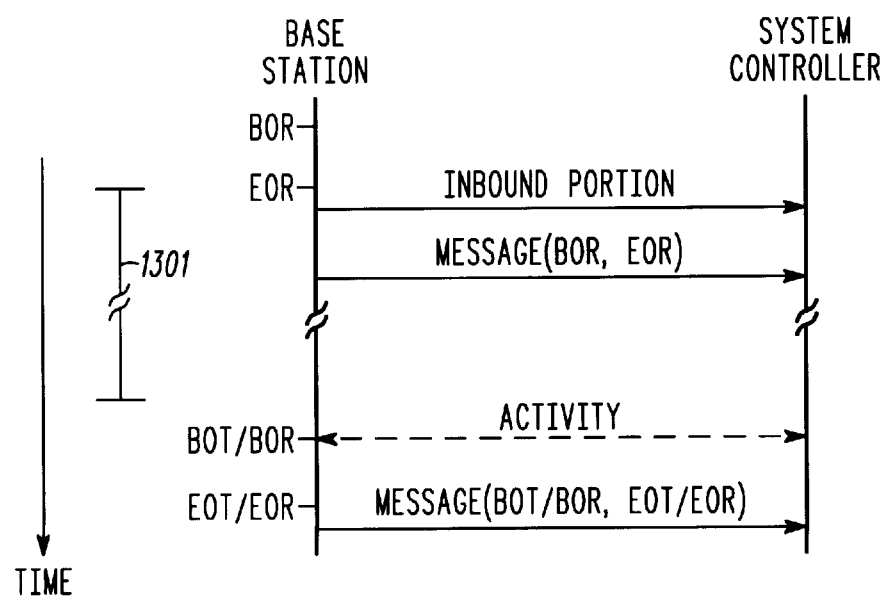

With progression of time shown from top to bottom, FIGS. 12 and 13 show an inbound portion of data being received by the base station 102, as indicated by the BOR and EOR, which inbound portion of data is then sent to the system controller 104. In both FIGS. 12 and 13, the inbound portion of data is shown being sent to the system controller 104 only after the EOR has occurred. In practice, this isn't required and it is often the case that conveyance of the inbound data to the system controller 104 is started prior to the EOR. In the examples shown, the BOR and EOR time stamps are conveyed to the system controller 104 simultaneously and after the EOR has been determined. However, the BOR could optionally be sent independent of the EOR, and vice versa. Regardless, after receiving the EOR, the system controller 104 initiates a session timer 1201, 1301 starting at a point in time indicated by the EOR. Because, in this example, the EOR time stamp is conveyed after the actual EOR has occurred, the session timer is adjusted to start at a point in time prior to reception of the EOR time stamp, thereby more accurately reflecting the actual progression of the session.

Figure 5:
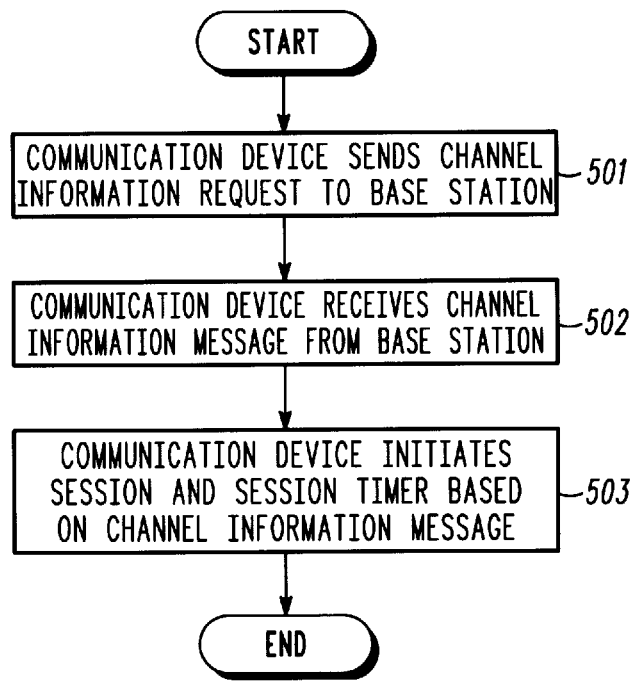
FIG. 5 is a flow chart illustrating steps for initiating the synchronization of a session timer in response to a channel information request.
Figure 6:
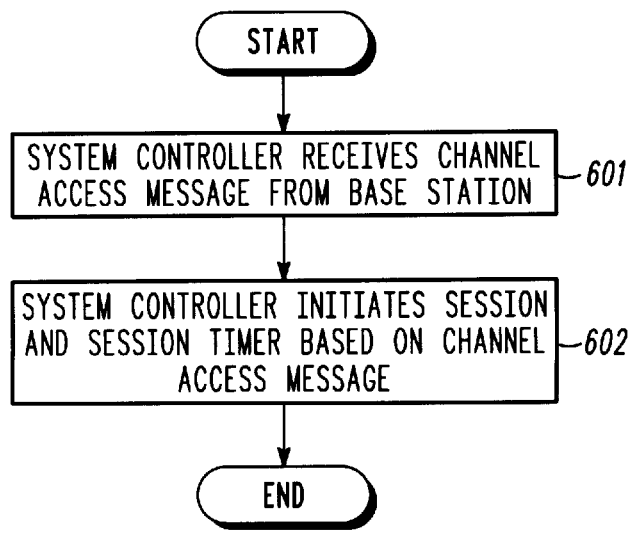
FIG. 6 is a flow chart illustrating steps for initiating the synchronization of a session timer in response to a channel access message.

As described above, specific forms of outbound activity (i.e., paging messages) can serve as the basis for synchronization activities. Similarly, specific forms of inbound activity can be used for synchronization in both communication devices and in the system controller, as illustrated in FIGS. 5 and 6. FIG. 5 is a flow chart illustrating steps for initiating the synchronization of a session timer in response to a channel information request. Particularly, FIG. 5 illustrates a method for use in a communication device. In the discussion of FIG. 5 and FIG. 6 (below), it is assumed that no session timer has been previously established.

At step 501, a communication device 101 transmits a channel information request (preferably via a control channel) which is thereafter received by the base station 102. Prior to transmitting the request, in the preferred embodiment, the communication device 101 is monitoring a control channel when the need to establish communications arises. The channel information request, which at least includes an identification of the communication device 101, alerts the receiving base station 102 to the communication device's 101 desire to establish communications.

Responsive to the channel information request, the base station 102 transmits a channel information message, which message is received by the communication device 101 at step 502. In the preferred embodiment, the channel information message includes information regarding communication resources (i.e., traffic channels) available for use by the communication device 101. Of particular concern to the present invention, the channel information message also serves as the basis, at step 503, for initiating a session and session timer in the communication device 101. This is further illustrated in FIGS. 14 and 15. With the progression of time shown from top to bottom, FIGS. 14 and 15 show a channel information request being sent from the communication device 101 to the base station 102. The channel information message sent in response is used by the communication device 101 to initialize a session timer 1401, 1501, as shown.

Closely related to the method illustrated in FIG. 5, FIG. 6 is a flow chart illustrating steps for initiating the synchronization of a session timer in response to a channel access message. At step 601, the system controller 104 receives a channel access message from the base station 102 via the variable delay network 103. (It is noted that the methods described in FIGS. 5 and 6 are best suited for use in systems in which the inbound delays imposed by the network 103 are not significant relative to the proper operation of session timers.) The channel access message, which at least includes identifications of the communication device 101 and the base station 102, is sent by the base station 102 in response to a channel information request sent by the communication device 101. In particular, the channel access message is sent by the base station 102 to the system controller 104 at substantially the same time the channel information message is sent to the communication device. The channel access message alerts the system controller 104 that the communication device 101 has taken steps toward establishing communications.

Upon receiving the channel access message, and thereby becoming informed of the establishment of communications for the communication device 101, the system controller 104 initiates a session and session timer at step 602. Once again, this is further illustrated in FIGS. 14 and 15. In particular, a channel access message is shown being sent from the base station 102 to the system controller 104 at essentially the same time the channel information message is sent to the communication device 101. The channel access message is used by the system controller 104 to initialize a session timer 1402, 1502, as shown.

Because the present invention bases initialization of the session timer on the actual transmission or reception of data, it allows the session timer maintained by a system controller to be very closely synchronized (assuming very short propagation delays due to transmission/reception via the wireless communication resources 109) to the session timer maintained by a communication device.

Figure 7:
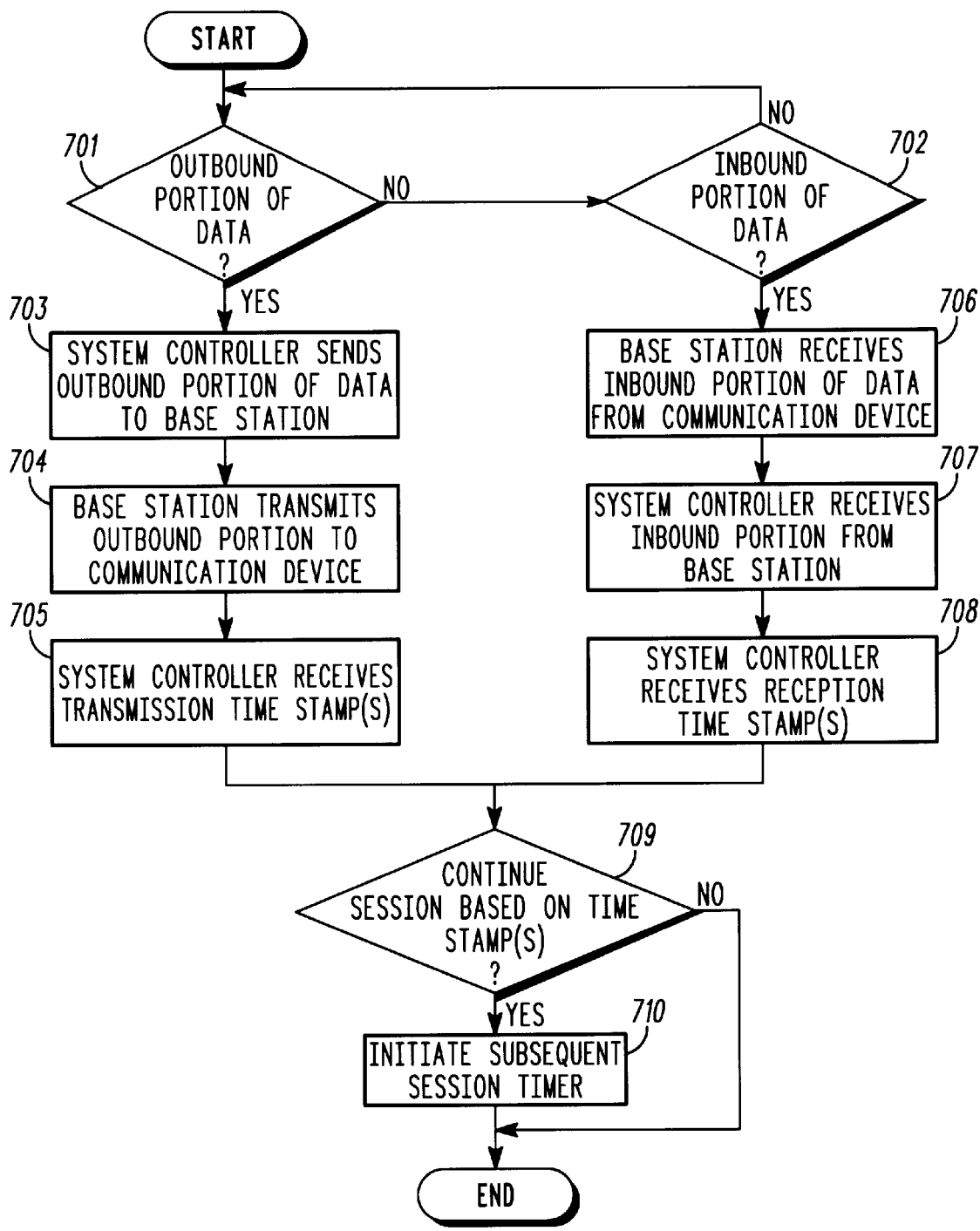
FIG. 7 is a flow chart illustrating steps for continuing the synchronization of a session timer in response to either an outbound or inbound portion of data.
Figure 8:
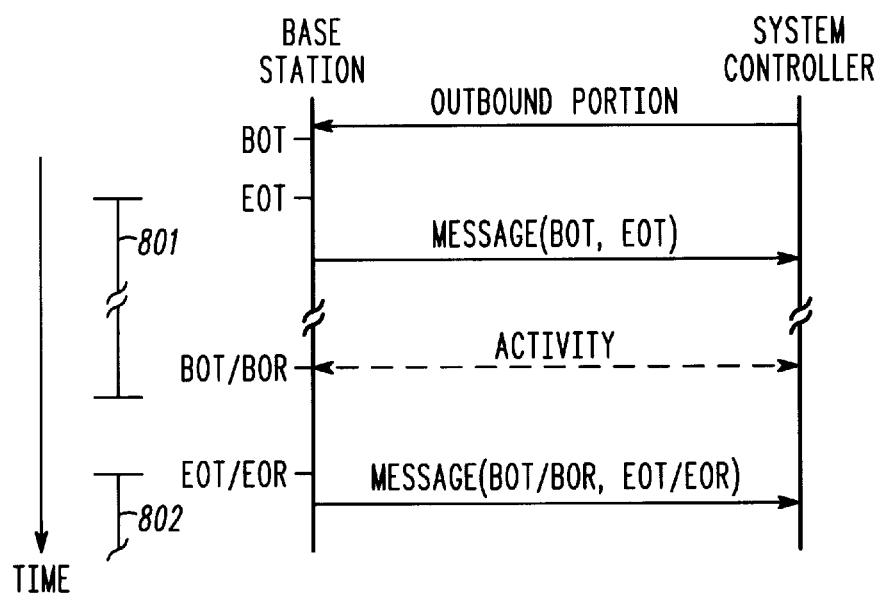
FIGS. 8–9 illustrate exemplary operations of an embodiment of the present invention based on an outbound portion of data.
Figure 9:
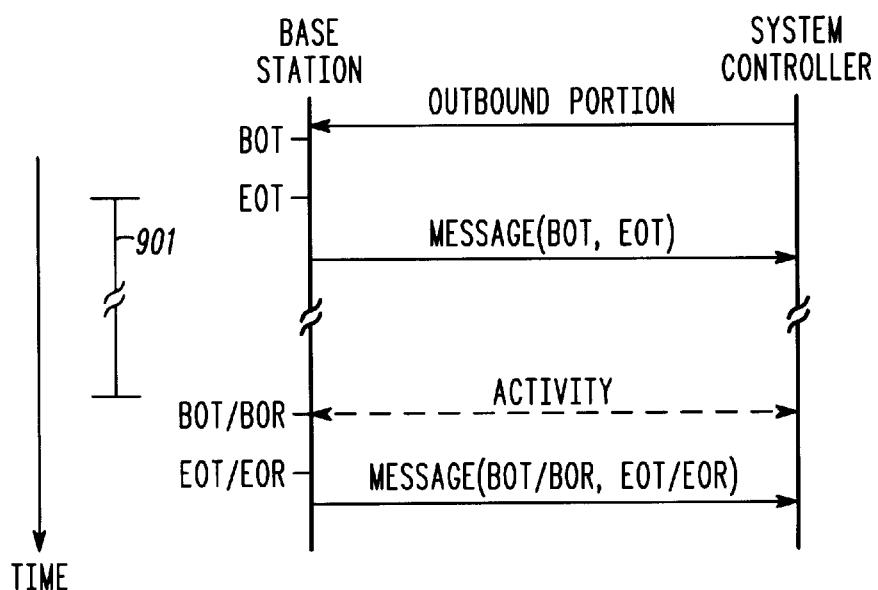

Once a session has been established for a given communication device, continued activity by that device will cause the session to be similarly continued, thereby facilitating communications However, if the communication device ceases to be a source of communication activity, the session will be discontinued after time out of the session timer and any attempted communications thereafter will be processed in a manner which requires more time and resources. The manner in which the present invention determines whether to continue a session is illustrated in FIG. 7. In particular, FIG. 7 is a flow chart illustrating steps for continuing the synchronization of a session timer in response to either an outbound or inbound portion of data. Throughout the discussion of FIG. 7, it is assumed that a session and session timer have been previously established for a given communication device 101, i.e., through the methods described in FIGS. 2–6.

At step 701, the system controller 104 determines whether any subsequent outbound portion of data needs to be transmitted to the communication device 101. If there is, steps 703–705 (identical in function to steps 201–203 of FIG. 2) cause the outbound portion of data to be transmitted by the base station 102, resulting in the system controller 104 receiving at least one subsequent transmission time stamp.

Alternatively, it is determined at step 702 whether there is any subsequent inbound portion of data to be processed. (It should be noted that the ordering of steps 701 and 702 shown is arbitrary and could be reversed.) In effect, step 702 is equivalent to the operator of the communication device 101 deciding to initiate a communication. Assuming this to be the case, steps 706–708 (identical in function to steps 401–403 of FIG. 4) cause the inbound portion of data and the at least one subsequent reception time stamp to be sent to the system controller 104. The net effect of steps 701 through 708 is to present at least one subsequent time stamp to the system controller 104 as an indication of activity (i.e., the existence of an ongoing or recent communication) involving the communication device 101.

Having received subsequent transmission or reception time stamps, the system controller 104 determines at step 709 whether to continue the ongoing session based on the time stamp(s). If the session is to be continued, a subsequent session timer is initiated by the system controller 104 at step 710. The subsequent session timer serves to delimit a continuing portion of the current session, i.e., the session is extended for an additional predetermined period of time as measured by the subsequent session timer. The minimum criteria for the decision of step 709 is whether the activity indicated by the at least one time stamp occurred prior to expiration of the current session timer. When subsequent BOT or BOR time stamps are used, the decision of step 709 is based on the subsequent BOT or BOR time stamp and the subsequent session timer is initialized, if at all, based on the subsequent EOT or EOR time stamp. This is illustrated in FIGS. 8–15.

FIGS. 8, 10, 12 and 14 (corresponding to sessions initiated by outbound data, a paging acknowledgment, inbound data, and channel information/access messages, respectively) illustrate the occurrence of activity relating to the communication device 101 prior to expiration of a session timer 801, 1001, 1201, 1402 The activity (shown as a dotted line in FIGS. 8, 12 and 14, or as outbound data in FIG. 10) gives rise to a BOT or BOR event which, when conveyed to the system controller 104 as time stamps, indicate that the activity occurred prior to the expiration of the session timer 801, 1001, 1201, 1402 as shown. Thus, even though the time stamps arrive at the system controller 104 after the expiration of the session timer 801, 1001, 1201, 1402, the session is allowed to continue by virtue of the subsequent session timer 802, 1002, 1202, 1403. As shown, the subsequent session timer 802, 1002, 1202, 1403 is initialized to begin at a point in time corresponding to the EOT or EOR resulting from the activity. It is noted that the session should always be initiated with the latest activity in either direction. Therefore, the latest activity represented as between an EOT or EOR should initiate the subsequent session timer. With the continuation of the session, the communication represented by the latest activity may proceed without further processing.

FIG. 14 additionally shows that activity relating to the communication device 101 is also used to continue the session timer 1401 maintained by the communication device 101. Since the activity (shown as a dotted line between the base station 102 and the communication device 101) occurs prior to when the session timer would have expired (dotted line indicated by reference numeral 1405), a subsequent session timer 1404 is initiated at a point in time corresponding to the activity. Because the activity itself is used to initiate the subsequent session timer 1404, no discontinuity with the session timer 1401 occurs.

FIGS. 9, 11, 13 and 15 (also corresponding to sessions initiated by outbound data, a paging acknowledgment, inbound data, and channel information/access messages, respectively) illustrate the occurrence of activity relating to a communication device after expiration of a session timer 901, 1101, 1301, 1502. The activity (shown as a dotted line in FIGS. 9, 13 and 15, or as outbound data in FIG. 11) gives rise to a BOT or BOR event which, when conveyed to the system controller 104 as time stamps, indicate that the activity occurred after expiration of the session timer 901, 1101, 1301, 1502 as shown. As a result, the current session is discontinued and, in order to allow the communication represented by the latest activity to continue, non-session based call initiation procedures (i.e., paging the communication device, receiving a response, etc.) must be executed.

The present invention teaches a method for synchronizing a session timer and, in so doing, allows communications involving a given communication unit to proceed in a more efficient manner. This is accomplished through the use of transmission and/or reception time stamps which indicate to a system controller when activity relating to a given communication unit (i.e., the transmission of outbound data or the reception of inbound data) has actually occurred. Additionally, paging acknowledgments, channel information messages, or channel access messages may be used for these purposes. In this manner, the effect of any delays incurred within the system infrastructure are masked, allowing an infrastructure-based session timer to be more accurately synchronized to a device-based session timer. As a result, the possibility of mistakenly terminated sessions is minimized.

What is claimed is:

1. In a wireless communication system comprising a plurality of communication devices in wireless communication with a wireless infrastructure, the wireless infrastructure comprising at least a base station in communication with a system controller, a method in the system controller for synchronizing a session timer between a communication device of the plurality of communication devices and the wireless infrastructure, the method comprising steps of:

sending, to the base station, an outbound portion of data;

receiving, from the base station, at least one transmission time stamp corresponding to the outbound portion of data;

initiating a session and the session timer based on the at least one transmission time stamp;

sending, to the base station, a subsequent outbound portion of data;

receiving, from the base station, at least one subsequent transmission time stamp corresponding to the subsequent outbound portion of data; and initiating a subsequent session timer based on the at least one subsequent transmission time stamp, the subsequent session timer delimiting a continuing portion of the session.

2. The method of claim 1, further comprising the step of receiving the at least one transmission time stamp, wherein the at least one transmission time stamp comprises an end of transmission time stamp.

3. The method of claim 2, further comprising the step of initiating the session timer based on the end of transmission time stamp.

4. The method of claim 1, further comprising the step of receiving the at least one subsequent transmission time stamp, wherein the at least one subsequent transmission time stamp comprises a subsequent beginning of transmission time stamp and a subsequent end of transmission time stamp.

5. The method of claim 4, further comprising the step of initiating the subsequent session timer based on the subsequent end of transmission time stamp when the subsequent beginning of transmission time stamp corresponds to a point in time prior to expiration of the session timer.

6. The method of claim 4, further comprising a step of discontinuing the session when the subsequent beginning of transmission time stamp corresponds to a point in time after expiration of the session timer.

7. In a wireless communication system comprising a plurality of communication devices in wireless communication with a wireless infrastructure the wireless infrastructure comprising at least a base station in communication with a system controller, a method in the system controller for synchronizing a session timer between a communication device of the plurality of communication devices and the wireless infrastructure, the method comprising steps of:

sending, to the base station, an outbound portion of data;

receiving, from the base station, at least one transmission time stamp corresponding to the outbound portion of data;

initiating a session and the session timer based on the at least one transmission time stamp;

receiving, from the base station, at least one reception time stamp corresponding to a received portion of data; and initiating a subsequent session timer based on the at least one reception time stamp, the subsequent session timer delimiting a continuing portion of the session.

8. The method of claim 7, further comprising the step of receiving the at least one subsequent reception time stamp, wherein the at least one subsequent reception time stamp comprises a beginning of reception time stamp and an end of reception time stamp.

9. The method of claim 8, further comprising the step of initiating the subsequent session timer based on the end of reception time stamp when the beginning of reception time stamp corresponds to a point in time prior to expiration of the session timer.

10. The method of claim 8, further comprising a step of discontinuing the session when the beginning of reception time stamp corresponds to a point in time after expiration of the session timer.

11. In a wireless communication system comprising a plurality of communication devices in wireless communication with a wireless infrastructure, the wireless infrastructure comprising at least a base station in communication with a system controller, a method in the system controller for synchronizing a session timer between a communication device of the plurality of communication devices and the wireless infrastructure, the method comprising steps of:

receiving, from the base station, a received portion of data;

receiving, from the base station, at least one reception time stamp corresponding to the received portion of data;

initiating a session and the session timer based on the at least one reception time stamp;

receiving, from the base station, a subsequent inbound portion of data;

receiving, from the base station, at least one subsequent reception time stamp corresponding to the subsequent inbound portion of data; and initiating a subsequent session timer based on the at least one subsequent reception time stamp, the subsequent session timer delimiting a continuing portion of the session.

12. The method of claim 11, further comprising the step of receiving the at least one reception time stamp, wherein the at least one reception time stamp comprises an end of reception time stamp.

13. The method of claim 12, further comprising the step of initiating the session timer based on the end of reception time stamp.

14. The method of claim 11, further comprising the step of receiving the at least one subsequent reception time stamp, wherein the at least one subsequent reception time stamp comprises a subsequent beginning of reception time stamp and a subsequent end of reception time stamp.

15. The method of claim 14, further comprising the step of initiating the subsequent session timer based on the subsequent end of reception time stamp when the subsequent beginning of reception time stamp corresponds to a point in time prior to expiration of the session timer.

16. The method of claim 14, further comprising a step of discontinuing the session when the subsequent beginning of reception time stamp corresponds to a point in time after expiration of the session timer.

17. In a wireless communication system comprising a plurality of communication devices in wireless communication with a wireless infrastructure, the wireless infrastructure comprising at least a base station in communication with a system controller, a method in the system controller for synchronizing a session timer between a communication device of the plurality of communication devices and the wireless infrastructure, the method comprising steps of:

receiving, from the base station, a received portion of data;

receiving, from the base station, at least one reception time stamp corresponding to the received portion of data;

initiating a session and the session timer based on the at least one reception time stamp;

sending, to the base station, an outbound portion of data;

receiving, from the base station, at least one transmission time stamp corresponding to the outbound portion of data; and initiating a subsequent session timer based on the at least one transmission time stamp, the subsequent session timer delimiting a continuing portion of the session.

18. The method of claim 17, further comprising the step of receiving the at least one transmission time stamp, wherein the at least one transmission time stamp comprises a beginning of transmission time stamp and an end of transmission time stamp.

19. The method of claim 18, further comprising the step of initiating the subsequent session timer based on the end of transmission time stamp when the beginning of transmission time stamp corresponds to a point in time prior to expiration of the session timer.

20. The method of claim 18, further comprising a step of discontinuing the session when the beginning of transmission time stamp corresponds to a point in time after expiration of the session timer.

21. In a wireless communication system comprising a plurality of communication devices in wireless communication with a wireless infrastructure, the wireless infrastructure comprising at least a base station in communication with a system controller, a method in the system controller for synchronizing a session timer between a communication device of the plurality of communication devices and the wireless infrastructure, the method comprising steps of:

sending, to the communication device via the base station, a paging message;

receiving, from the communication device via the base station, a paging acknowledgment corresponding to the paging message;

initiating a session and the session timer based on the paging acknowledgment;

sending, to the base station, an outbound portion of data;

receiving, from the base station, at least one transmission time stamp corresponding to the outbound portion of data; and initiating a subsequent session timer based on the at least one transmission time stamp, the subsequent session timer delimiting a continuing portion of the session.

22. The method of claim 21, further comprising the step of sending the paging message via a control channel.

23. The method of claim 22, further comprising the step of receiving the paging acknowledgment via the control channel.

24. The method of claim 21, further comprising the step of sending the paging message via a control channel and a data channel.

25. The method of claim 24, further comprising the step of receiving the paging acknowledgment via one of the control channel and the data channel.

26. The method of claim 21, further comprising the step of receiving the at least one transmission time stamp, wherein the at least one transmission time stamp comprises a beginning of transmission time stamp and an end of transmission time stamp.

27. The method of claim 26, further comprising the step of initiating the subsequent session timer based on the end of transmission time stamp when the beginning of transmission time stamp corresponds to a point in time prior to expiration of the session timer.

28. The method of claim 26, further comprising a step of discontinuing the session when the beginning of transmission time stamp corresponds to a point in time after expiration of the session timer.

29. In a wireless communication system comprising a plurality of communication devices in wireless communication with a wireless infrastructure, the wireless infrastructure comprising at least a base station in communication with a system controller, a method in the system controller for synchronizing a session timer between a communication device of the plurality of communication devices and the wireless infrastructure, the method comprising steps of:

receiving, from the base station, a channel access message, wherein the channel access message is responsive to a channel information request from the communication device;

initiating a session and the session timer based on an actual time of reception of the channel access message;

sending, to the base station, an outbound portion of data;

receiving, from the base station, at least one transmission time stamp corresponding to the outbound portion of data; and initiating a subsequent session timer based on the at least one transmission time stamp, the subsequent session timer delimiting a continuing portion of the session.

30. The method of claim 29, further comprising the step of receiving the at least one transmission time stamp, wherein the at least one transmission time stamp comprises a beginning of transmission time stamp and an end of transmission time stamp.

31. The method of claim 30, further comprising the step of initiating the subsequent session timer based on the end of transmission time stamp when the beginning of transmission time stamp corresponds to a point in time prior to expiration of the session timer.

32. The method of claim 30, further comprising a step of discontinuing the session when the beginning of transmission time stamp corresponds to a point in time after expiration of the session timer.

33. In a wireless communication system comprising a plurality of communication devices in wireless communication with a wireless infrastructure, the wireless infrastructure comprising at least a base station in communication with a system controller, a method in the system controller for synchronizing a session timer between a communication device of the plurality of communication devices and the wireless infrastructure, the method comprising steps of:

receiving, from the base station, a channel access message, wherein the channel access message is responsive to a channel information request from the communication device;

initiating a session and the session timer based on an actual time of reception of the channel access message;

receiving, from the base station, at least one reception time stamp corresponding to a received portion of data; and initiating a subsequent session timer based on the at least one reception time stamp, the subsequent session timer delimiting a continuing portion of the session.

34. The method of claim 33, further comprising the step of receiving the at least one reception time stamp, wherein the at least one subsequent reception time stamp comprises a beginning of reception time stamp and an end of reception time stamp.

35. The method of claim 34, further comprising the step of initiating the subsequent session timer based on the end of reception time stamp when the beginning of reception time stamp corresponds to a point in time prior to expiration of the session timer.

36. The method of claim 34, further comprising a step of discontinuing the session when the beginning of reception time stamp corresponds to a point in time after expiration of the session timer.

37. In a wireless packet data communication system comprising a plurality of communication devices in wireless communication with a wireless infrastructure, the wireless infrastructure comprising at least a base station in communication with a router, a method for synchronizing a session timer between a communication device of the plurality of communication devices and the wireless infrastructure, the method comprising steps of:

sending, by the router to the base station, at least one outbound data packet;

transmitting, by the base station to the communication device, the at least one outbound data packet to produce at least one transmitted outbound data packet;

sending, by the base station to the router, at least one message comprising an end of transmission time stamp corresponding to the at least one transmitted outbound data packet; and initiating, by the router, a session and the session timer based on the end of transmission time stamp.

38. The method of claim 37, further comprising steps of:

sending, by the router to the base station, at least one subsequent outbound data packet;

transmitting, by the base station to the communication device, the at least one subsequent outbound data packet to produce at least one subsequently transmitted outbound data packet;

sending, by the base station to the router, at least one subsequent message comprising a subsequent beginning of transmission time stamp and a subsequent end of transmission time stamp corresponding to the at least one subsequently transmitted outbound data packet;

initiating, by the router, a subsequent session timer based on the subsequent end of transmission time stamp when the subsequent beginning of transmission time stamp corresponds to a point in time prior to expiration of the session timer, the subsequent session timer delimiting a continuing portion of the session; and discontinuing the session when the subsequent beginning of transmission time stamp corresponds to another point in time after expiration of the session timer.

39. The method of claim 37, further comprising steps of:

receiving, by the base station from the communication device, at least one inbound data packet to produce at least one received inbound data packet;

sending, by the base station to the router, at least one subsequent message comprising a beginning of reception time stamp and an end of reception time stamp corresponding to the at least one received inbound data packet;

initiating, by the system controller, a subsequent session timer based on the end of reception time stamp when the beginning of reception time stamp corresponds to a point in time prior to expiration of the session timer, the subsequent session timer delimiting a continuing portion of the session; and discontinuing the session when the beginning of reception time stamp corresponds to another point in time after expiration of the session timer.

40. In a wireless packet data communication system comprising a plurality of communication devices in wireless communication with a wireless infrastructure, the wireless infrastructure comprising at least a base station in communication with a router, a method for synchronizing a session timer between a communication device of the plurality of communication devices and the wireless infrastructure, the method comprising steps of:

receiving, by the base station from the communication device, at least one inbound data packet to produce at least one received inbound data packet;

sending, by the base station to the router, the at least one received inbound data packet;

sending, by the base station to the router, at least one message comprising an end of reception time stamp corresponding to the at least one received inbound data packet; and initiating, by the router, a session and the session timer based on the end of reception time stamp.

41. The method of claim 40, further comprising steps of:

receiving, by the base station from the communication device, at least one subsequent inbound data packet to produce at least one subsequently received inbound data packet;

sending, by the base station to the router, at least one subsequent message comprising a subsequent beginning of reception time stamp and a subsequent end of reception time stamp corresponding to the at least one subsequently received inbound data packet;

initiating, by the router, a subsequent session timer based on the subsequent end of reception time stamp when the subsequent beginning of reception time stamp corresponds to a point in time prior to expiration of the session timer, the subsequent session timer delimiting a continuing portion of the session; and discontinuing the session when the subsequent beginning of reception time stamp corresponds to another point in time after expiration of the session timer.

42. The method of claim 40, further comprising steps of:

sending, by the router to the base station, at least one outbound data packet;

transmitting, by the base station to the communication device, the at least one outbound data packet to produce at least one transmitted outbound data packet;

sending, by the base station to the router, at least one subsequent message comprising a beginning of transmission time stamp and an end of transmission time stamp corresponding to the at least one transmitted outbound data packet;

initiating, by the router, a subsequent session timer based on the end of transmission time stamp when the beginning of transmission time stamp corresponds to a point in time prior to expiration of the session timer, the subsequent session timer delimiting a continuing portion of the session; and discontinuing the session when the beginning of transmission time stamp corresponds to another point in time after expiration of the session timer.

* * * * *